United States Patent [19]

Wreszinski

[11] 4,038,129
[45] July 26, 1977

[54] METHOD AND APPARATUS FOR CONCENTRATING LIQUIDS

[76] Inventor: Rolf W. Wreszinski, Caixa Postal, 9549, Sao Paulo, Brazil

[21] Appl. No.: 594,212

[22] Filed: July 9, 1975

[51] Int. Cl.² .......................... B01D 1/16; F26B 3/12
[52] U.S. Cl. .............................. 159/4 CC; 159/4 MS; 159/48 L
[58] Field of Search ............. 159/4 CC, 16, 48, 4 MS, 159/4 K; 203/49

[56] References Cited

U.S. PATENT DOCUMENTS

| | | | |
|---|---|---|---|
| 999,972 | 8/1911 | Ekenberg | 159/4 F |
| 1,020,632 | 3/1912 | Bevenot et al. | 159/4 CC |
| 1,301,288 | 4/1919 | MacLachlan | 159/4 CC |
| 1,314,802 | 9/1919 | Hechenbleikner | 159/4 CC |
| 1,385,660 | 7/1921 | Bodman et al. | 159/48 L |
| 2,554,138 | 5/1951 | Cross | 159/27 A |
| 2,764,233 | 9/1956 | Skinner | 159/13 A |
| 3,153,609 | 10/1964 | Markant et al. | 159/48 |
| 3,206,379 | 9/1965 | Hill | 159/48 L |
| 3,428,463 | 2/1969 | Sargeant | 159/48 |

FOREIGN PATENT DOCUMENTS

| | | | |
|---|---|---|---|
| 483,392 | 9/1929 | Germany | 159/4 MS |
| 233,551 | 11/1944 | Switzerland | 159/4 K |
| 249,283 | 3/1926 | United Kingdom | 159/4 ST |
| 289,116 | 4/1928 | United Kingdom | 159/4 CC |

Primary Examiner—Norman Yudkoff
Assistant Examiner—J. Sofer
Attorney, Agent, or Firm—Wilmer Mechlin

[57] ABSTRACT

Method and apparatus for continuously concentrating liquids in a plurality of stages, the apparatus having an enclosure vented to atmosphere and enclosing a like plurality of overhead spaced sets or rows of nozzles and a plurality of troughs, one for and underlying each nozzle set. In each stage, liquid of one concentration is pumped to one nozzle set and partially evaporated by being sprayed from the set, with immediately prior or concurrent heating, as a flat, fan-shaped spray for fall into the underlying trough as a liquid of higher concentration, which, depending on its concentration, is either the starting liquid of the next stage or the product concentrate, the evaporation for air-sensitive liquids being conducted in an environment inert to the liquid.

13 Claims, 4 Drawing Figures

METHOD AND APPARATUS FOR CONCENTRATING LIQUIDS

BACKGROUND OF THE INVENTION

Heretofore, the usual practice in continuously concentrating or evaporating liquids has been to heat and evaporate the liquids under pressure or partial vacuum in closed vessels of single or multiple effect evaporators having tube-type calandrias. Some variations have been proposed, such as the multiple effect, concentric shell evaporator disclosed in Thelen et al U.S. Pat. No. 945,640, the multiple plate, oscillating spray distillation apparatus of Hammer et al U.S. Pat. No. 3,211,633, and, for food dehydration, the rotating cone apparatus of Birdseye U.S. Pat. No. 2,521,442 and the multiple effect evaporation by freezing of Toulmin U.S. Pat. No. 2,628,485. However, in general, prior continuous liquid concentrators or evaporators have required expensive equipment and prolonged exposure of the liquid to heat exchange with correspondingly high energy consumption, and, for food concentrates, such as tomato paste, evaporation, particularly under partial vacuum, can detrimentally affect taste, color and vitamin and enzyme content. It is with the solution of these problems in continuously concentrating liquids that the present invention is particularly concerned.

SUMMARY OF THE INVENTION

The primary object of the present invention is to provide an improved method and apparatus for continuously concentrating liquids, whereby, by concentrating in a plurality of stages in each of which liquid of one concentration is pumped to one of a like plurality of overhead spaced rows of nozzles and partially evaporated by being sprayed from the row, with immediately prior or concurrent heating, as a flat, fan-shaped spray into an underlying of a like plurality of troughs as a liquid of higher concentration, which, depending on its concentration, is the starting liquid of the next stage or the product concentrate, and the evaporation for all stages is conducted in a vented enclosure, the liquid is concentrated rapidly and at minimum expense for both equipment and energy.

Another object of the invention is to provide an improved method and apparatus for continuously concentrating a liquid in a plurality of successive stages of different, progressively higher liquid concentrations, wherein in each stage liquid of one of the different concentrations is pumped to and heated to boiling in a heat exchanger unit and immediately thereafter partially evaporated by being sprayed from an overhead row of one or more nozzles for fall at atmospheric pressure into an underlying trough as a liquid of higher concentration.

An additional object of the invention is to provide a method and apparatus according to the preceding object, wherein the heat exchanger units of the stages are separate units of a common heat exchanger and the liquids of the different concentrations are pumped to the common heat exchanger at controlled rates by suitably regulated pumps for compensating as needed for any differences in their boiling points.

A further object of the invention is to provide an improved method and apparatus for continuously concentrating a liquid in a plurality of successive stages of different, progressively higher concentrations, wherein the stages are conducted in a vented enclosure and in each stage liquid of one concentration is pumped to an overhead row of one or more nozzles and partially evaporated by being sprayed from the row for fall to an underlying trough while being concurrently heated by contact with a counterflowing hot gas blown into the enclosure.

Another object of the invention is to provide a method and apparatus according to the primary object, wherein a component of the liquid in heated condition is oxidizable or otherwise sensitive to air and by blowing in an inert gas or other means, an environment inert to the component is maintained in the enclosure.

Other objects, features and advantages of the invention will appear hereinafter in the detailed description, be particularly pointed out in the appended claims and be illustrated in the accompanying drawings, in which:

FIGURE DESCRIPTION

DETAILED DESCRIPTION

Figure 1:
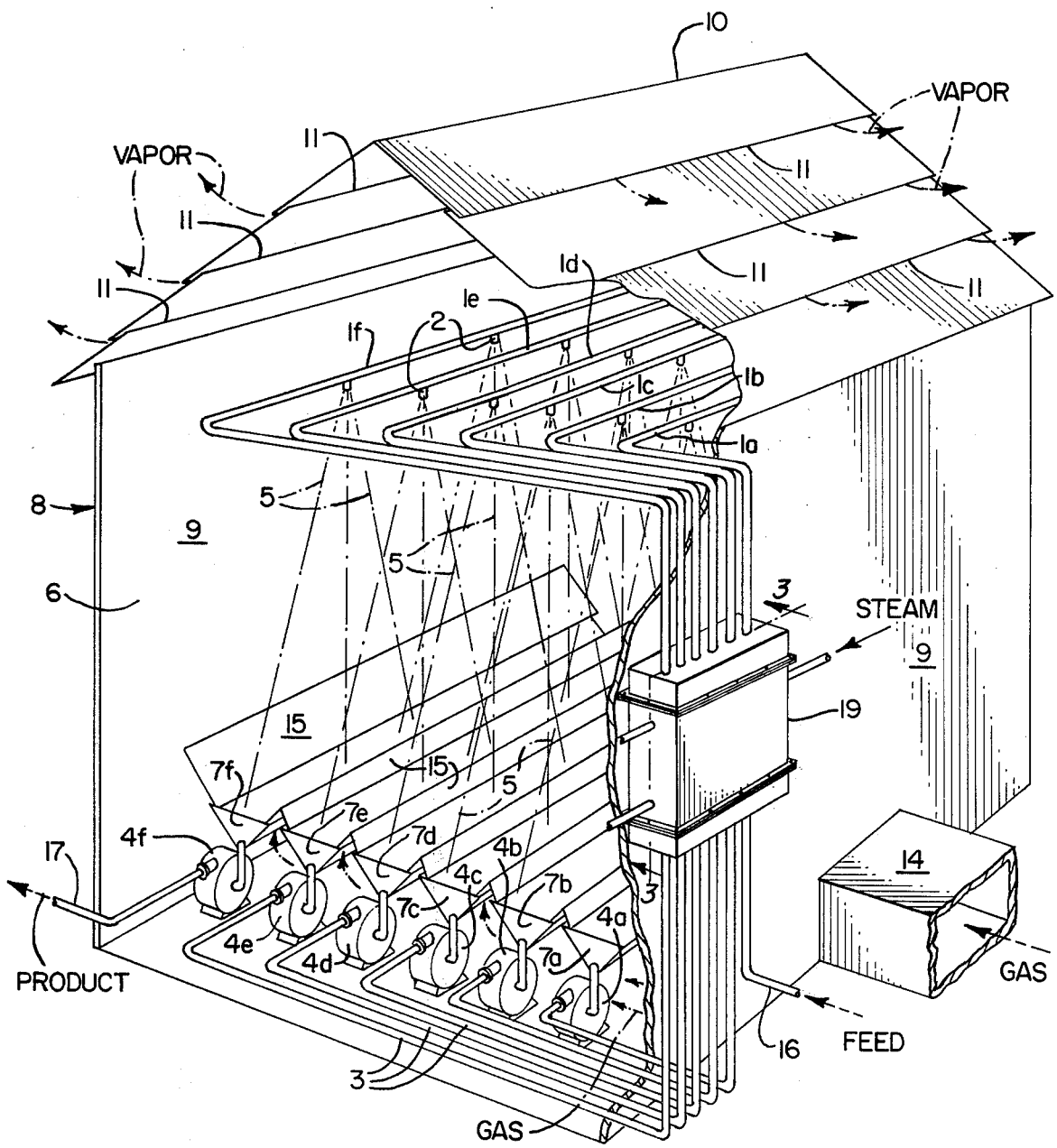
FIG. 1 is a somewhat schematic perspective view of a preferred embodiment of the improved apparatus of the present invention, with the front wall and part of a side wall and roof of the enclosure removed to more clearly illustrate certain of the details of construction.

Referring now in detail to the drawings in which like reference characters indicate like parts, the improved method and apparatus of the present invention, while not suitable for liquids unable to withstand successive heatings for short periods or containing a volatile component required in the product concentrate, are otherwise widely applicable for continuously concentrating or evaporating liquids and particularly adapted for use on aqueous solutions of organic and inorganic matter, such as sugar and tomato juice, and will be so described as exemplary of the invention.

In accordance with the present invention, a liquid is continuously concentrated or evaporated in a plurality of successive or sequential stages, each handling liquid of one or a different starting concentration. In each stage, liquid of one concentration is pumped to an overhead or elevated row or set 1 of one or more nozzles 2 through suitable connecting piping or tubing 3 by a pump 4 and partially vaporated by being sprayed from the nozzle row, with immediately prior or concurrent heating, fall as a spray or curtain 5 of finely dispersed droplets through an evaporation chamber 6 into an underlying trough 7 as a liquid of higher concentration, which, depending on its concentration, is either the starting liquid of the next stage or the product concentrate.

Figure 2:
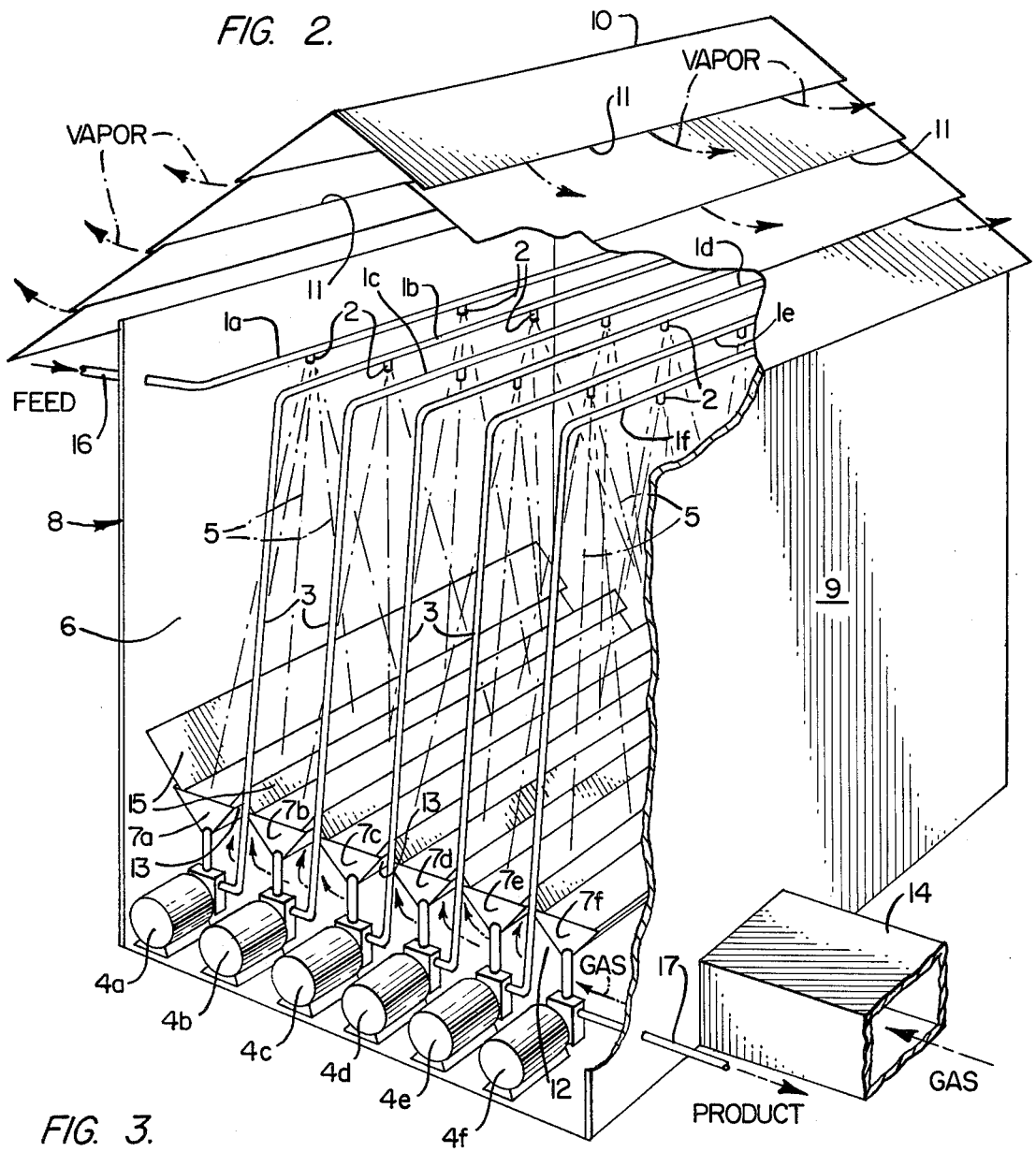
FIG. 2 is a view similar to FIG. 1 of a second embodiment of the apparatus.

Depending somewhat on how other factors are regulated, the number of stages required for the continuous concentration may differ for different liquids. However, since a six-stage concentration is more or less typical, the improved apparatus of each of the embodiments of FIGS. 1 and 2 is illustrated as adapted to perform or produce such a continuous concentration. Each apparatus is comprised of a plurality of overhead spaced sets or rows 1, one for each stage, of the nozzles 2, the rows suitably being horizontally disposed and preferably being arranged in sequence in parallel, laterally spaced and aligned relation and at the same elevated level for providing a fall of the desired height. At a suitably common lower level, each apparatus has a plurality of the troughs 7, one for each stage and each below and underlying or in vertical alignment with one of the nozzle sets or rows 1. In the same sequence as the nozzle rows 1, the troughs 7 preferably are parallel to each other and arranged in side-by-side or juxtaposed relation.

For drainage, each of the troughs 7 slopes toward and drains into one of the pumps 4 for pumping of its residual liquid either to the nozzle row 1 of the next stage or, if the last trough, as product concentrate for any necessary further processing. Although illustrated differently in the two embodiments, the pumps 4 of the plurality, one for each trough 7, preferably are positive displacement rotary pumps and, to suit the concentration of liquids changing substantially in boiling point or evaporation rate with change in concentration, also preferably are of variable speed and individually regulatable or controllable in their pumping rates. While the nozzle rows, troughs and pumps are designated generally as 1, 7 and 4, respectively, each is further identified by one of the suffixes $a$, $b$, $c$, etc., to indicate the sequence in which it acts on or contacts the liquid.

The nozzle sets or rows 1, troughs 7 and intervening evaporation chamber 6 and usually the pumps 4, are enclosed, housed or contained in an enclosure or housing 8 of suitable size for the desired concentration rate. Unlike the troughs 7, which contact the different concentrations of the liquid and therefore usually will be made of stainless steel or like non-corrosive material, the enclosure will be contacted only by the evaporant and does not have to withstand either high pressure or partial vacuum, since the spray evaporation of this invention requires neither. Thus, the enclosure 8 may be a simple and inexpensive structure of box shape, concrete or tile-floored, with flat walls 9 of aluminum sheet or masonry and an aluminum panel or other suitable roof 10. For non-polluting evaporants, such as the water vapor of aqueous solutions, the enclosure is vented or exhausted directly to atmosphere, as through vent slots 11 in the illustrated louvered roof 10, which conveniently is steep or high-peaked not only to ward off the elements but also to direct any condensate forming on its inside to the exterior through the same slots.

While a maximum surface area, far greater than practically obtainable in closed-type evaporators, is exposed for evaporation by spraying the liquid in each stage from its nozzle set or row 1 to the related trough 7, the efficiency of the plural stage evaporation of this invention is dependent upon preserving the substantial integrity or separateness of the spray or sprays 5 of each set or row from the different concentration sprays of the other sets. Each nozzle or spray head 2 therefore must be capable of directing a spray of finely dispersed liquid droplets to and, as residual liquid, into the related trough. The preferred nozzles 2 are of the fan-type, each adapted to spray or emit a substantially flat, fan-shaped or diverging, downward vertical spray 5 of atomized or fine particle or droplet liquid and the nozzles are so relatively directed that the sprays falling from any nozzles of the same row are substantially in the same vertical plane and laterally spaced from and, in the illustrated single row sets, parallel to the planes of the sprays from nozzles of other rows, so that the sprays from each row or set will fall into the underlying trough. Coupled with the preferred arrangement of the sets 1 and troughs 7 in the sequence of their stages, this ensures that any stray droplets at worst will fall into an adjoining trough and mix or commingle with liquid of the immediately preceding or succeeding concentration.

To prevent loss of the residual liquid of different concentrations therepast, the troughs in the embodiment of FIG. 1 under certain conditions can be joined or connected along their contiguous edges. However, to satisfy all conditions, each of the embodiments is illustrated with the troughs 7 raised or elevated above floor level and laterally spaced from each other and any adjoining side wall 9 for providing a passageway 12 below and openings 13 at sides of the troughs, through which gas introduced, injected or blown into the enclosure 8 through a side intake 14, can flow to the evaporation chamber 6. In such case, loss of residual liquid past the troughs 7 is prevented by loosely covering the longitudinally extending side openings 13 by relatively raised hoods, baffles or deflectors 15, suitably of inverted V-shape or flat, depending on whether the underlying opening is between or at an end of the row of troughs.

Alike in the foregoing respects and also in having an inlet or feed pipe 16 through which the initial or feed liquid to be concentrated is pumped to the first stage nozzle row 1$a$ and an outlet or discharge pipe 17 through which the product concentrate is pumped by the pump 4$f$ from the last trough 7$f$, the embodiments of FIGS. 1 and 2 differ primarily in the manner in which the liquid is heated for partial evaporation in each stage. In the embodiment of FIG. 1, the liquid concentration of each stage is heated, preferably to boiling, immediately prior to spraying, by being pumped through a heat exchanger unit 18 in advance or ahead of the related nozzle row 1. The units 18 for the different stages are separate, but, for convenience and economy, preferably are separate units or sections of a common heat exchanger 19, which, as illustrated, can be mounted on the outside of one of the walls 9 of the enclosure 8.

Figure 3:
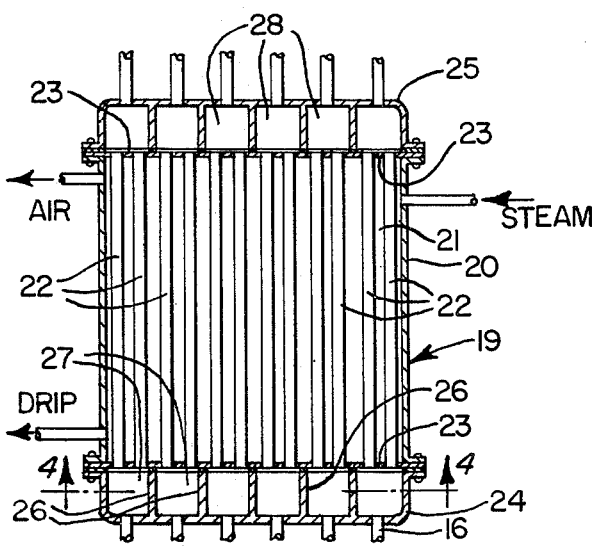
FIG. 3 is a fragmentary vertical sectional view on an enlarged scale, taken along lines 3—3 of FIG. 1.
Figure 4:
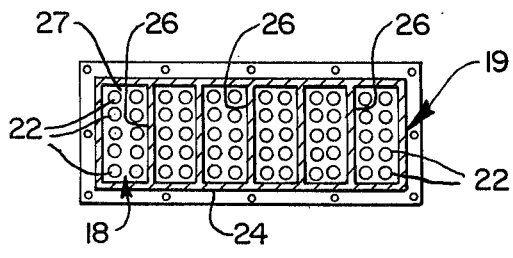
FIG. 4 is a horizontal sectional view taken along lines 4—4 of FIG. 3.

As shown in FIGS. 3 and 4, the common or single heat exchanger 19 suitably may be a calandria of the vertical tube type, heated by steam from a boiler (not shown) and having a vertical shell 20 enclosing in a steam chamber 21 a nest of vertical tubes 22 conveniently arranged in banks and anchored in and projecting through tube sheets 23 at opposite ends of the steam chamber. If, as intended, the liquid of the starting concentration of each stage is to be heated to boiling in a single, preferably upward, pass through the calandria 19, each stage may have but one inlet to and outlet from the calandria, but usually will require a set of several or a plurality of the tubes 22, with consequent manifolding at inlet and outlet. In the illustrated calandria 19, the manifolding is accomplished by dividing or partitioning the lower and upper headers 24 and 25, as by integral dividers 26, into a like number or plurality of inlet and outlet compartments 27 and 28, respectively, one of each for each stage and each open to the adjoining ends of a pair of banks or other set of the tubes 22. The unit 18 for each stage thus includes an inlet compartment 27, the corresponding, related or confronting outlet compartment 28 and the connecting or interposed set of the tubes 22.

Pumped to its separate or individual heat exchanger unit 18 by the related pump 4 at a rate controlled, as necessary, to compensate for any substantial difference in the boiling points of the different concentrations, the liquid in each stage is heated to boiling in a single pass through its unit. Immediately after passing through its heat exchanger unit 18, the liquid of each stage is pumped or passed to the related nozzle set 1 and, still boiling and under the pressure of its pump 4, sprayed from the set's one or more nozzles 2. If the liquid contains a solute or other component that, when hot, is oxidizable or otherwise to air, the continuous replenishment of the evaporant vapor in the evaporation chamber 6 will usually suffice not only to induce flow or circulation of the vapor from the chamber to and through the roof vent slots 11, but also to maintain within the enclosure 8 a substantially oxygen-free environment. However, if additional circulation is wanted in a particular installation, this can be provided by supplementing or replacing unassisted roof venting by a positive fan or like exhaust system (not shown) or by blowing gas into the chamber 6 through the intake 14, passageway 12 and openings 13.

In the embodiment of FIG. 2, the liquid of each concentration is pumped by the pump 4 of the appropriate stage directly to the related nozzle row 1 and heated concurrently with or during spraying from the row's one or more nozzles 2. The concurrent heating is obtained or produced by contacting the spray or sprays 5 from that row with counterflowing hot gas blown or introduced or injected under positive or even negative pressure into the enclosure 8 through the intake 14 and flowing to the evaporation chamber 6 through the bottom passageway 12 and side openings 13. Spread or distributed substantially uniformly across or over the evaporation chamber 6 by the placement of the openings 13 at or along both sides of the troughs 7 and the deflecting action of the hoods 15, the upflowing hot gas not only will heat all of the sprays 5 at the same time but the upward forced circulation or flow within the enclosure 8 caused by the hot gas, will facilitate both evaporation of the liquid and exhausting of the evaporant vapor. Should concurrent heating by the hot gas not be sufficient, it can readily be supplemented by preheating the liquid, as needed, as by a heat exchanger 19 such as used in the first embodiment.

For liquids having components that in heated condition are oxidizable or otherwise sensitive to air, any gas introduced in either embodiment through the intake 14 should contain substantially no free or available oxygen and thus be inert to or non-oxidizing for the liquid. When available, the exhaust or flue gas from a boiler, cyclonically or otherwise filtered and, for the first embodiment, also cooled, usually will be a satisfactory inert gas.

With the apparatus of either embodiment, the main or important factors affecting or determining the rate of evaporation are: the rate of feed of the starting liquid, the number of stages, the height of fall of the sprays 5, the dimensions of the troughs 7, the number and size of the nozzles 2 in each row 1, the rate of pumping of the liquid from each trough to the next nozzle row or discharge, and the temperature and flow rate at which the heating medium, steam in the first embodiment and hot gas in the second, is applied. By appropriately regulating or varying these factors, the continuous concentration of this invention can readily be regulated or controlled to meet the rates required for particular liquids in various installations.

Using the apparatus of either embodiment, the improved method is carried out or performed by pumping the initial or feed liquid to be concentrated through the inlet pipe 16 to the first stage nozzle set or row 1a, partially evaporating the liquid by spraying it from any nozzles 2 of that set, with immediately prior or concurrent heating, for fall as the preferred flat, fan-shaped spray 5 to and as residual liquid into the first trough 7a, pumping the residual liquid by the pump 4a to the second stage nozzle set 1b, spraying the liquid to the second trough 7b, and so on in the indicated sequence, repeating in each succeeding stage but upon liquid of progressively higher concentration, the steps of spraying, heating, pumping and troughing, until liquid of the desired product concentration reaches the last trough 7f. In the final step, the product concentrate is pumped from the trough 7f by the pump 4f through the discharge pipe 17 for any necessary further processing, such as centrifuging for sugar juice and blending and homogenizing for tomato paste. As applied to organic solutions, the repeated short duration sprayings and heatings not only are essential to the present method but, depending on the characteristics of the solute, one or both can have a very beneficial effect on the quality of the product.

For the improved method, the processing time from starting or initial liquid to product concentrate is very short, about 90 to 180 seconds, depending largely on the number of stages necessary. Compared with other concentrators or evaporators of like capacity, the improved apparatus is low not only in construction cost but also in power consumption, since in each stage the liquid is partially evaporated either immediately after or concurrently with heating, and pressure above or below atmospheric is not needed in the evaporation chamber 6. For organic liquids presenting enzymatic problems, such as tomato juice, the repeated heatings will destroy or drastically reduce the enzyme content and the product paste will have good color and high pectin content. Also, for organic liquids in general, the preferred upward pass through the calandria 19 will tend to inhibit baking of the organic matter in the tubes 8.

A specific example of the present invention is the application of the six-stage apparatus of the embodiment of FIG. 1 to the continuous concentration of sugar juice into molasses. Starting as the feed liquid with suitably screened, dilute juice, milled or otherwise extracted from sugar cane, the juice is pumped to and heated to boiling in the first stage heat exchanger unit 18 and immediately passed to and sprayed for partial evaporation from the first nozzle row 1a. The first partial evaporation, as the spray 5 falls to the underlying trough 7a, results in an increase in concentration to about 17° Brix in the trough. In the succeeding stages, in each of which the starting residual liquid is pumped to and heated to boiling in the next of the units 18 of the calandria 19 and sprayed from the corresponding nozzle row 1, the juice is progressively concentrated to 21° Brix, 25° Brix, 31° Brix, 43° Brix and in the final stage to product molasses of 92° Brix. The relative concentrations in the various stages are deliberately controlled by regulating the pumping rates of the pumps 4, so that no pump of any stage will handle and no nozzle 2 will be clogged by a gritty solution. The product molasses is pumped by pump 4f from the last trough 7f through the discharge pipe 17 for further processing, usually first by centrifuges.

From the above detailed description it will be apparent that there have been provided method and apparatus for continuously concentrating liquids which are advantageous in several respects over prior continuous concentrators or evaporators. It should be understood that the described and disclosed embodiments are merely exemplary of the invention and that all modifications are intended to be included that do not depart from the spirit of the invention and the scope of the appended claims.

Having now described my invention, I claim:

1. A method of continuously concentrating a liquid in a plurality of successive stages, comprising in each stage pumping a concentration of the liquid to a related one of a plurality of spaced overhead nozzle sets, without partitioning between said sets spraying said liquid from each nozzle of said set as a finely dispersed spray separate from the spray from any nozzle of any other set to an underlying one of a like plurality of liquid-separate troughs, and heating said liquid in each stage by heat transfer from a heating medium common to all stages for effecting with said spraying partial evaporation of said liquid during said fall.

2. A method according to claim 1, wherein both the nozzle sets and troughs are arranged in juxtaposed relation, and including enclosing said nozzle sets and troughs in a vented enclosure for substantially inhibiting mixing of sprays from different nozzle rows during the falls thereof.

3. A method according to claim 2, wherein each set is a single row, the liquid is sprayed from each nozzle as a substantially flat diverging spray substantially coplanar with the spray from any nozzle of the same row and substantially parallel to the spray from any nozzle of any other row.

4. A method according to claim 2, wherein the liquid in each state is heated by contacting the sprays of all stages during the falls thereof with a counterflowing hot gas, and including introducing said hot gas under pressure into the enclosure below the troughs for forced upward flow therepast to contact said sprays and exhaust evaporant vapor therefrom said said enclosure.

5. A method according to claim 2, wherein the liquid in each stage is heated by being pumped through and heated in a heat exchanger unit therefor in advance of the nozzle set thereof.

6. A method according to claim 5, wherein the liquid in each stage is heated to boiling in a single pass through the heat exchanger unit therefor and immediately thereafter is sprayed from the nozzle set thereof.

7. A method according to claim 2, wherein a nonvolatile component of the liquid is air-sensitive, and including maintaining in said enclosure a gaseous environment inert to said component.

8. A method according to claim 7, wherein the environment is maintained by introducing into said enclosure a gas inert to the component.

9. Apparatus for continuously concentrating a liquid in a plurality of successive stages, comprising for each stage one of a plurality of spaced sequentially arranged nozzle sets enclosed without partitioning therebetween in a common enclosure, each nozzle of each set spraying downwardly a liquid of one concentration for a downward vertical fall as a substantially flat diverging spray separate from the spray from any nozzle of any other set, a like plurality of liquid-separate troughs positioned below and each vertically aligned with one of the nozzle sets for receiving residual liquid of higher concentration from said set, means for pumping separately the initial liquid to the first stage nozzle set and the residual liquid from each trough except the last to a succeeding nozzle set, and means for heating the liquid in each stage by heat transfer from a heating medium common to all stages for effecting with said spraying partial evaporation of said liquid during said fall, said enclosure also enclosing said sprays and troughs and being vented for exhausting evaporant vapor.

10. Apparatus according to claim 9, wherein the nozzle sets are rows arranged in parallel at the same elevation, the spray from each nozzle is substantially coplanar with the spray from any other nozzle of the same row and parallel to and spaced from the spray from any nozzle of any other row, and the troughs are laterally spaced and juxtaposed and have hooded openings at sides thereof.

11. Apparatus according to claim 10, wherein the heating means for all stages is hot gas blown into the enclosure below the troughs and passing upward through the hooded openings and flowing counter to and contacting the sprays during the falls thereof.

12. Apparatus according to claim 9, wherein the heating means for each stage is a heat exchanger unit through which the liquid is pumped and heated to boiling between the pump means and nozzle set of said stage.

13. Apparatus according to claim 12, wherein the pump means for the stages are individually regulatable variable rate pumps, and the heat exchanger units are separate units of a common steam-heated calandria.

* * * * *